UNITED STATES PATENT OFFICE.

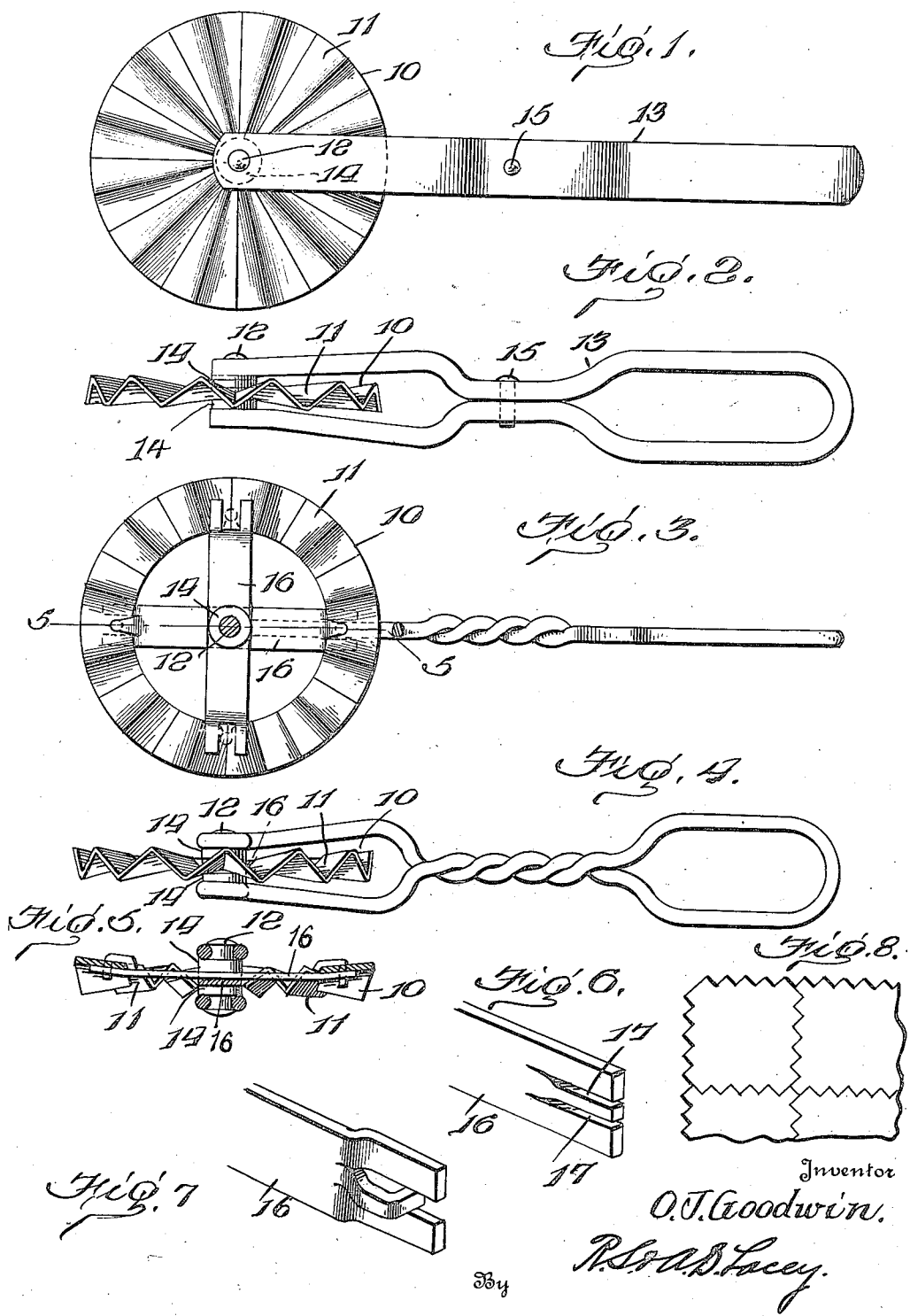

OSCAR J. GOODWIN, OF RAINIER, WASHINGTON.

CAKE-CUTTER.

1,204,009.   Specification of Letters Patent.   Patented Nov. 7, 1916.

Application filed May 10, 1916. Serial No. 96,665.

*To all whom it may concern:*

Be it known that I, OSCAR J. GOODWIN, a citizen of the United States, residing at Rainier, in the county of Thurston and State of Washington, have invented certain new and useful Improvements in Cake-Cutters, of which the following is a specification.

This invention relates to improvements in implements for cutting out pastry, such as cookies and the like, and has for one of its objects to improve the construction and increase the efficiency and utility of devices of this character.

With these and other objects in view, the invention consists in certain novel features of construction, as hereinafter shown and described and then specifically pointed out in the claims; and in the drawings illustrative of the preferred embodiment of the invention—Figure 1 is a side elevation of the improved implement; Fig. 2 is an edge view of the parts shown in Fig. 1; Fig. 3 is a view similar to Fig. 1 illustrating a modification in the construction, with part of the handle broken away; Fig. 4 is an edge view of the structure shown in Fig. 3; Fig. 5 is a sectional detail on the line 5—5 of Fig. 3; Fig. 6 is an enlarged perspective view of a portion of one of the connecting arms employed in the structure shown in Figs. 3, 4 and 5 before being bent for connection to the rotating cutting member; Fig. 7 is a view similar to Fig. 6 showing the member bent for connection to the rotating cutting member; Fig. 8 is a diagrammatic view on a reduced scale of a portion of a sheet of dough after being operated on by the improved implement.

Corresponding and like parts are referred to in the following description and indicated in all the views of the drawings by the same reference characters.

The improved device comprises a rotary member formed into a plurality of scallops or serrations whereby a scalloped or serrated cutting edge is produced, and a handle in which the rotary member is mounted. The rotary member is indicated conventionally at 10 and in Figs. 1 and 2 is constructed from a single circular plate of metal pressed or otherwise formed into radiating alternating V-shaped depressions and ridges indicated at 11 so that the periphery or cutting edge of the plate is formed in scalloped shape as shown. In the structure shown in Figs. 3, 4 and 5 the rotary member is constructed from an annular plate likewise bent into the alternating V-shaped ridges and depressions 11. In the structure shown in Figs. 1 and 2, an axle 12 extends through the center of the plate and is connected in a suitable handle, represented as a whole at 13. In the structure disclosed in Figs. 1 and 2 the handle is formed from a single piece of metal bent intermediate its ends to form sides spaced apart, the side portions bearing upon opposite sides of the rotary member and provided with bearings to receive the terminals of the axle. Spacing washers 14 are disposed between the confronting faces of the side members of the handle and the rotary member to retain it in proper position relative to the handle, and likewise to cause it to operate more smoothly.

When the handle is constructed as shown in Figs. 1 and 2, the sides will be compressed intermediate the ends and connected by a rivet or other holding device 15. The handle may likewise be constructed of a suitable casting of iron, aluminum, or the like, or of a single piece of wire bent into the shape shown in Figs. 3 and 4 with terminal eyes to receive the axle 12 and twisted intermediate the ends, as shown.

When constructed, as shown in Figs. 3, 4 and 5, transverse supporting members 16 will be arranged at right angles to each other and crossing intermediate their ends with apertures to receive the axle 12 at their centers. At their outer ends the members 16 will be formed with coöperating clefts, represented at 17 in Fig. 6, thus forming three tongue-like portions extending normally in parallel relation. The outer tongue-like portions will be bent laterally at one side of the member 16 while the central tongue-like portion will be bent laterally in the opposite direction. In applying the member 16 to the annular rotary member the outer tongue-like portions will be disposed at one side of the member 10 and the central tongue-like portions at the opposite side of the member 10, with the terminal of the central tongue-like portion bent at right angles and passed through an aperture in the member 10, as indicated in Fig.

5. By this means the members 16 are firmly coupled to the annular rotary member 10. By this means the annular rotary member is firmly coupled to the member 16 and the latter forming spoke-like members through which the axle 12 passes. In the structure shown in Figs. 3 and 4 the washers 14 will be employed in the same manner and designed to accomplish the same purpose as in Figs. 1 and 2.

With an implement thus described it will be obvious that by rolling the device over a sheet of dough the latter will be severed in zig-zag shape, as indicated in Fig. 8 which represents a portion of a sheet of dough from which the cookies or other articles are to be severed. It will be obvious that cookies or other similar articles of any desired shape may be cut by simply rolling the implement over the sheet of dough.

The parts are entirely of metal, and may be constructed of aluminum or like non-corrosive metal.

Having thus described the invention, what is claimed as new is:

1. An implement of the class described comprising an annular cutter member, a plurality of arms crossing each other intermediate the ends and perforated to receive an axle and each with a plurality of clefts to form tongues, said tongues bearing upon opposite sides of the annular cutting member to couple the arms thereto, and a handle in which said axle is disposed.

2. An implement of the class described comprising an annular cutter member, a plurality of arms crossing each other intermediate the ends and perforated to receive an axle and each with a plurality of clefts to form tongues, said tongues bearing upon opposite sides of the annular cutting member and one of said tongues bent laterally and extended through an aperture in the cutting member, and a handle in which said axle is disposed.

In testimony whereof I affix my signature.

OSCAR J. GOODWIN. [L. S.]